United States Patent
Yano et al.

(10) Patent No.: US 9,068,053 B2
(45) Date of Patent: Jun. 30, 2015

(54) FLUORO-RUBBER COMPOSITION AND BLADDER FOR TIRE FABRICATION

(75) Inventors: Masashi Yano, Kodaira (JP); Daisuke Ota, Settsu (JP); Shuichi Okutsu, Kamakura (JP)

(73) Assignees: BRIDGESTONE CORPORATION, Tokyo (JP); E.I. DU PONT DE NEMOURS AND COMPANY, Wilmington, DE (US); DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 13/817,965

(22) PCT Filed: Aug. 25, 2010

(86) PCT No.: PCT/JP2010/064401
§ 371 (c)(1),
(2), (4) Date: May 2, 2013

(87) PCT Pub. No.: WO2012/026006
PCT Pub. Date: Mar. 1, 2012

(65) Prior Publication Data
US 2013/0225758 A1    Aug. 29, 2013

(51) Int. Cl.
*C08L 15/02* (2006.01)
*C08L 27/16* (2006.01)
(Continued)

(52) U.S. Cl.
CPC . *C08K 3/04* (2013.01); *B29D 22/02* (2013.01); *B29D 30/0654* (2013.01); *C08L 27/12* (2013.01); *C08K 5/0025* (2013.01); *B29D 2030/665* (2013.01)

(58) Field of Classification Search
USPC ................................. 524/495, 544
See application file for complete search history.

(56) References Cited

U.S. PATENT DOCUMENTS 6,291,576 B1 * 9/2001 Schmiegel .............. 524/544
2003/0065132 A1 * 4/2003 Bauerle et al. .......... 528/401
(Continued)

FOREIGN PATENT DOCUMENTS

JP    02-084153    *  4/1987
JP    A-62-84153       4/1987
(Continued)

OTHER PUBLICATIONS

International Search Report issued in International Application No. PCT/JP2010/064401 dated Nov. 9, 2010.

*Primary Examiner* — Peter D Mulcahy
*Assistant Examiner* — Henry Hu
(74) *Attorney, Agent, or Firm* — Oliff PLC (57) ABSTRACT

A fluoro rubber composition which is able to make both a high tensile strength and a high elongation at break after vulcanization compatible with each other and from which favorable mechanical characteristics are obtained even in a high-temperature environment; and a bladder for tire fabrication, which is manufactured using the same are provided. The fluoro rubber composition includes a rubber component containing a fluoro rubber and carbon black, wherein in a dynamic viscoelasticity test of an unvulcanized rubber by a rubber process analyzer (RPA) (measurement temperature: 100° C., measurement frequency: 1 Hz), a difference $\delta G_A{}'$ (G'(1%)−G'(100%)) between a shear modulus G' (1%) at the time of a dynamic strain of 1% and a shear modulus G' (100%) at the time of a dynamic strain of 100% is 120 kPa or more and not more than 3,000 kPa.

8 Claims, 1 Drawing Sheet

(51) Int. Cl.
  C08K 3/04   (2006.01)
  B29D 22/02  (2006.01)
  B29D 30/06     (2006.01)
  C08L 27/12     (2006.01)
  C08K 5/00      (2006.01)
  B29D 30/66     (2006.01)

(56) References Cited

U.S. PATENT DOCUMENTS

2008/0249240 A1* 10/2008 Bandyopadhyay ........... 524/847

2013/0217816 A1* 8/2013 Yano et al. .................... 524/238

FOREIGN PATENT DOCUMENTS

| JP | 03-122153 | * | 5/1991 |
| JP | A-3-122153 | | 5/1991 |
| JP | A-6-41378 | | 2/1994 |
| JP | A-9-188793 | | 7/1997 |
| JP | 2002-192528 | * | 2/2002 |
| JP | A-2002-192528 | | 7/2002 |
| JP | A-2002-265733 | | 9/2002 |
| JP | 2004-026897 | * | 1/2004 |
| JP | A-2004-26897 | | 1/2004 |

* cited by examiner

FLUORO-RUBBER COMPOSITION AND BLADDER FOR TIRE FABRICATION

TECHNICAL FIELD

The present invention relates to a fluoro rubber composition having excellent mechanical characteristics after vulcanization; and a bladder for tire fabrication, which is manufactured using the same.

BACKGROUND ART

In recent years, fluoro rubbers are industrially used in broad fields centering on the automobile and machinery industries because they give rubber compositions which are excellent in terms of heat resistance, chemical resistance, and the like.

However, it may not be said that their mechanical characteristics are sufficient, and their application to fields where a high mechanical strength is required was limited.

On the contrary, Patent Document 1 proposes a combination of a fluoro rubber with an epichlorohydrin rubber; and Patent Document 2 discloses a fluoro rubber vulcanizable composition containing (A) a fluorine-containing elastomer copolymer composed of a vinylidene fluoride unit and at least one fluorine-containing monomer and containing iodine or bromine, the fluorine-containing elastomer copolymer having an intrinsic viscosity (mL/g) in the range of from 50 to 100, (B) an organic peroxide, (C) a co-crosslinking agent, and (D) specified carbon black.

In addition, Patent Document 3 discloses a fluorine-containing elastomer vulcanizable composition including (a) a vulcanizable fluorine-containing elastomer, (b) a polyol vulcanizing agent containing a polyol compound as a crosslinking agent, and (c) a specified aliphatic amine compound; Patent Document 4 discloses a heat-resistant fluoro rubber composition composed of (a) 100 parts by weight of a fluoro rubber, (b) from 1 to 30 parts by weight of a divalent metal compound (provided that zinc oxide is excluded), (c) from 0.05 to 100 parts by weight of zinc oxide, (d) from 0.05 to 10 parts by weight of a polyhydroxy compound, and (e) from 0.05 to 10 parts by weight of a crosslinking auxiliary agent; and Patent Document 5 discloses a vulcanizable fluoro rubber composition containing (a) a tetrafluoroethylene/perfluoroalkyl vinyl ether copolymer containing an iodine atom and/or a bromine atom, (b) an organic peroxide having a purity of 95% or more, and (c) a co-crosslinking agent having a purity of 95% or more.

However, all of these proposals are concerned with improvements in composition materials, such as an improvement of fluoro rubber species, an improvement in a combination with other rubber or a compounding agent, and the like, and it was difficult to make both a high tensile strength and a high elongation at break compatible with each other.

Then, a more enhancement of mechanical characteristics by a new technique is demanded.

PRIOR ART DOCUMENTS

Patent Documents

[Patent Document 1] JP A 62-84153
[Patent Document 2] JP-A-3-122153
[Patent Document 3] JP-A-6-41378
[Patent Document 4] JP-A-9-188793
[Patent Document 5] JP-A-2002-265733

SUMMARY OF THE INVENTION

Problem to be Solved by the Invention

Under the foregoing circumstances, a problem of the present invention is to provide a fluoro rubber composition which is able to make both a high tensile strength and a high elongation at break after vulcanization compatible with each other and from which favorable mechanical characteristics are obtained even in a high-temperature environment; and a bladder for tire fabrication, which is manufactured using the same.

Means for Solving Problem

In order to achieve the foregoing object, the present inventors made extensive and intensive investigations. As a result, it has been found that by controlling a microstructure in a fluoro rubber composition by optimizing compounding materials in the composition or improving a kneading method or the like and also allowing a difference in shear modulus in a dynamic viscoelasticity test to fall within a fixed range, mechanical characteristics of the fluoro rubber composition after vulcanization may be greatly enhanced.

Specifically, the present invention provides:

(1) A fluoro rubber composition comprising a rubber component containing a fluoro rubber and carbon black, wherein
the fluoro rubber is at least one member selected among a copolymer of (i) at least one monomer selected among tetrafluoroethylene, hexafluoropropene, pentafluoropropene, trifluoroethylene, chlorotrifluoroethylene, vinyl fluoride, perfluoroalkyl vinyl ether and propylene, and (ii) vinylidene fluoride; a tetrafluoroethylene/perfluoroalkyl vinyl ether copolymer; and a tetrafluoroethylene/propylene copolymer;
in a kneading step (A) of compounding the carbon black in the rubber component, an average shear rate of a rotor tip point of a kneading machine is 100 (1/sec) or more, and a kneading maximum temperature $T_m$ is 120° C. or higher and not higher than 200° C.; and
in a dynamic viscoelasticity test of an unvulcanized rubber by a rubber process analyzer (RPA) (measurement temperature: 100° C., measurement frequency: 1 Hz), a difference $\delta G_A'$ (G'(1%)–G'(100%)) between a shear modulus G' (1%) at the time of a dynamic strain of 1% and a shear modulus G' (100%) at the time of a dynamic strain of 100% is 120 kPa or more and not more than 3,000 kPa;

(2) The fluoro rubber composition as set forth in (1), further comprising a vulcanization system compounding agent, wherein
in a dynamic viscoelasticity test of a vulcanized rubber by a rubber process analyzer (RPA) (measurement temperature: 60° C., measurement frequency: 1 Hz), a difference $\delta G_B'$ (G'(1%)–G'(10%)) between a shear modulus G' (1%) at the time of a dynamic strain of 1% and a shear modulus G' (10%) at the time of a dynamic strain of 10% is 200 kPa or more and not more than 10,000 kPa;

(3) The fluoro rubber composition as set forth in (1) or (2), wherein after vulcanization, a tensile strength at 25° C. is 10 MPa or more and not more than 50 MPa, and an elongation at break at 25° C. is 400% or more and not more than 800%; and a tensile strength at 160° C. is 1 MPa or more and not more than 20 MPa, and an elongation at break at 160° C. is 150% or more and not more than 500%;

(4) The fluoro rubber composition as set forth in any one of (1) to (3), wherein after vulcanization, a tear strength at 25° C. is 20 N/mm or more and not more than 60 N/mm, and a tear strength at 160° C. is 3 N/mm or more and not more than 30 N/mm;

(5) The fluoro rubber composition as set forth in any one of (1) to (4), wherein a compounding amount of the carbon black is 10 parts by mass or more and not more than 50 parts by mass based on 100 parts by mass of the rubber component;

(6) The fluoro rubber composition as set forth in any one of (2) to (4), wherein the vulcanization system compounding agent contains an organic peroxide, and the organic peroxide is a dialkyl peroxide;

(7) The fluoro rubber composition as set forth in any one of (2) to (5), wherein the vulcanization system compounding agent contains a co-crosslinking agent, and the co-crosslinking agent is triallyl isocyanurate; and (8) A bladder for tire fabrication, which is manufactured using the fluoro rubber composition as set forth in (1) to (7).

Effect of the Invention

According to the present invention, it is possible to provide a fluoro rubber composition which is able to make both a high tensile strength and a high elongation at break after vulcanization compatible with each other and from which favorable mechanical characteristics are obtained even in a high-temperature environment; and a bladder for tire fabrication, which is manufactured using the same.

MODES FOR CARRYING OUT THE INVENTION

The present invention is hereunder described with reference to embodiments.

<Fluoro Rubber Composition>

The fluoro rubber composition of the present embodiment comprises a rubber component containing a fluoro rubber and carbon black, wherein in a dynamic viscoelasticity test of an unvulcanized rubber by a rubber process analyzer (RPA) (measurement temperature: 100° C., measurement frequency: 1 Hz), a difference $\delta G_A'$ (G'(1%)–G'(100%)) between a shear modulus G' (1%) at the time of a dynamic strain of 1% and a shear modulus G' (100%) at the time of a dynamic strain of 100% is 120 kPa or more and not more than 3,000 kPa.

As described above, a fluoro rubber itself is not sufficient in terms of mechanical characteristics, and in order to use the fluoro rubber as a molding material, more durability is required. On the other hand, it is known that carbon black is excellent as a reinforcing agent of rubber, and in particular, the carbon black is a filler indispensable for rubber products which are required to have abrasion resistance or strength.

It is known that when the carbon black is mixed with a general rubber, a gel is formed. Then, it may be considered that mechanical characteristics of the rubber are greatly influenced depending upon what kind of microstructure is formed by this gel within the rubber.

In the present embodiment, it has been found that in view of the fact that even in the case where carbon black is mixed with a fluoro rubber, a gel (so-called "carbon gel") is formed within the rubber, when a device such as a kneading method of rubber as described later, etc. is performed to control a microstructure of the foregoing carbon gel, mechanical characteristics of the obtained fluoro rubber composition inclusive of a tensile strength and an elongation at break are greatly improved.

Then, so far as mechanical properties of an unvulcanized rubber corresponding to the microstructure of the foregoing carbon gel are concerned, in the case where in a dynamic viscoelasticity test by a rubber process analyzer (RPA) (measurement temperature: 100° C., measurement frequency; 1 Hz), attention is paid to a difference $\delta G_A'$ (G'(1%)–G'(100%)) between a shear modulus G' (1%) at the time of a dynamic strain of 1% and a shear modulus G' (100%) at the time of a dynamic strain of 100%, and the $\delta G_A'$ is 120 kPa or more and not more than 3,000 kPa, excellent mechanical characteristics corresponding to the microstructure of the foregoing carbon gel after vulcanization are exhibited. Incidentally, the foregoing RPA is a rheometer which is well-known as an analyzer for studying viscoelastic characteristics and processing behavior of a rubber mixture and which is capable of independently changing the frequency, the temperature, and the strain.

When the $\delta G_A'$ is less than 120 kPa, it may be impossible to achieve the formation of a carbon gel network for obtaining the tensile strength. On the other hand, when it exceeds 3,000 kPa, a reinforcement of a flexible carbon gel network for obtaining the elongation is not formed. The $\delta G_A'$ is preferably 200 kPa or more and not more than 2,000 kPa, and more preferably 300 kPa or more and not more than 1,500 kPa.

On the other hand, in the fluoro rubber composition of the present embodiment after vulcanization, it is desirable that in a dynamic viscoelasticity test by the foregoing rubber process analyzer (RPA) (measurement temperature: 60° C., measurement frequency: 1 Hz), a difference $\delta G_B'$ (G'(1%)–G'(10%)) between a shear modulus G' (1%) at the time of a dynamic strain of 1% and a shear modulus G' (10%) at the time of a dynamic strain of 10% is 200 kPa or more and not more than 10,000 kPa. Incidentally, the foregoing terms "after vulcanization" are described later.

By allowing the $\delta G_B'$ to fall within the foregoing range, the formation of a carbon gel network sufficient for obtaining the tensile strength or the formation of a reinforcement of a flexible carbon gel network for obtaining the elongation is achieved. The $\delta G_B'$ is more preferably 300 kPa or more and not more than 7,000 kPa, and still more preferably 300 kPa or more and not more than 3,000 kPa.

It is desirable that the fluoro rubber composition of the present embodiment satisfies the foregoing range of the difference in shear modulus, thereby having the following mechanical characteristics after vulcanization.

Specifically, first of all, it is desirable that after vulcanization, a tensile strength at 25° C. is 10 MPa or more and not more than 50 MPa, and an elongation at break at 25° C. is 400% or more and not more than 800%; and that a tensile strength at 160° C. is 1 MPa or more and not more than 20 MPa, and an elongation at break at 160° C. is 150% or more and not more than 500%.

The foregoing tensile strength at 25° C. is more preferably 20 MPa or more and not more than 40 MPa, and the foregoing elongation at break at 25° C. is more preferably 500% or more and not more than 700%.

In addition, the foregoing tensile strength at 160° C. is more preferably 5 MPa or more and not more than 20 MPa, and the foregoing elongation at break at 160° C. is more preferably 200% or more and not more than 450%.

Incidentally, the foregoing elongation at break and tensile strength are measured in conformity with JIS K 6251:2004.

The foregoing tear strength at 25° C. is more preferably 30 N/mm or more and not more than 50 N/mm, and the foregoing tear strength at 160° C. is more preferably 5 N/mm or more and not more than 20 N/mm. Incidentally, the foregoing tear strength is measured in conformity with JIS K 6252:2001 (test piece: unnotched angle shape).

The fluoro rubber composition of the present embodiment contains a rubber component containing a fluoro rubber and carbon black.

(Fluoro Rubber)

The foregoing fluoro rubber is at least one member selected among a copolymer of (i) at least one member selected among tetrafluoroethylene, hexafluoropropylene, pentafluoropropylene, trifluoroethylene, chlorotrifluoroethylene, vinyl fluoride, perfluoroalkyl vinyl ether and propylene, and (ii) vinylidene fluoride; a tetrafluoroethylene/perfluoroalkyl vinyl ether copolymer; and a tetrafluoroethylene/propylene copolymer; with a copolymer (especially a binary copolymer or a ternary copolymer) of (i) at least one member selected among tetrafluoroethylene, hexafluoropropylene, pentafluoropropylene trifluoroethylene, chlorotrifluoroethylene, vinyl fluoride, perfluoroalkyl vinyl ether and propylene, and (ii) vinylidene fluoride being preferable.

It is preferable that the rubber component in the present embodiment is composed of only a fluoro rubber. However, a small amount of other rubber such as an epichlorohydrin rubber, a silicone rubber, a butyl rubber, a halogenated butyl rubber, an acrylic rubber, etc. may also be compounded within the range where such compounding does not violate the dissolution of the problem of the present invention.

(Carbon Black)

The carbon black which is compounded in the fluoro rubber composition of the present embodiment is preferably furnace black which is manufactured by the furnace process, and any commercially available products can be used. Above all, hard black is especially preferable. The hard black as referred to herein indicates SAF, ISAF, HAF, or the like, and it is preferable that such carbon black has a specific surface area by nitrogen adsorption (hereinafter referred to as "$N_2SA$") of 25 $m^2/g$ or more and not more than 180 $m^2/g$ and a dibutyl phthalate absorption amount (hereinafter referred to as "DBP absorption amount") of 60 mL/100 g or more and not more than 180 mL/100 g.

This is because what the $N_2SA$ is 25 $m^2/g$ or more and not more than 180 $m^2/g$ is effective for the formation of a carbon gel network with reinforcing properties. In addition, this is because what the DBP absorption amount of the carbon black is 60 mL/100 g or more and not more than 180 mL/100 g is effective for the formation of a flexible carbon gel network.

Examples of the carbon black which satisfies the foregoing $N_2SA$ and DBP absorption amount include GPF (NA: 27 $m^2/g$, DBP absorption amount: 87 mL/100 g), FEF ($N_2SA$: 42 $m^2/g$, DBP absorption amount: 115 mL/100 g), LI-HAF ($N_2SA$: 74 $m^2/g$, DBP absorption amount: 103 mL/100 g), HAF (N330, $N_2SA$: 77 $m^2/g$, DBP absorption amount: 101 mL/100 g), N-339 ($N_2SA$: 83 $m^2/g$, DBP absorption amount: 128 mL/100 g), N-351 ($N_2SA$: 74 $m^2/g$, DBP absorption amount: 124 mL/100 g), IISAF (N285, $N_2SA$: 98 $m^2/g$, DBP absorption amount: 124 mL/100 g) ISAF (N220, $N_2SA$: 115 $m^2/g$, DBP absorption amount: 113 mL/100 g), N-234 ($N_2SA$: 124 $m^2/g$, DBP absorption amount: 125 mL/100 g) SAF (N110, $N_2SA$: 139 $m^2/g$, DBP absorption amount: 113 mL/100 g), SAF-HS ($N_2SA$: 142 $m^2/g$, DBP absorption amount: 130 mL/100 g), and the like.

Of these, LI-HAF, HAF, and ISAF are especially preferable.

The foregoing carbon black can be used in an amount of preferably 10 parts by mass or more and not more than 50 parts by mass, more preferably 10 parts by mass or more and not more than 40 parts by mass, and especially preferably 20 parts by mass or more and not more than 25 parts by mass based on 100 parts by mass of the rubber component.

Incidentally, the foregoing carbon black may be used alone or in combination of plural kinds thereof.

(Vulcanization System Compounding Agent)

Examples of the vulcanization system compounding agent which is further compounded in the fluoro rubber composition of the present embodiment include an organic peroxide, a co-crosslinking agent, and a metal compound as a crosslinking auxiliary agent which is compounded, if desired.

The organic peroxide is not particularly limited so far as it has a function as a crosslinking agent, and examples thereof include benzoyl peroxide, tert-butyl hydroperoxide, 2',4-bichlorobenzoyl peroxide, di-tert-butyl peroxide, dicumyl peroxide, tert-butylcumyl peroxide, 1,1-di(tert-butylperoxy) 3,3,5-trimethylcyclohexane 2,5-dimethyl-2,5-di(tert-butylperoxy)hexane, 2,5-dimethyl-2,5-di(tert-butylperoxy)hexine-3, 1,3-di(2-tert-butylperoxyisopropyl)benzene, 2,5-dimethyl-2,5-di(benzoylperoxy)hexane, tert-butyl peroxybenzoate, tert-butyl peroxyisopropyl carbonate, n-butyl-4,4-di(tert-butylperoxy)valerate, 2,5-dimethylhexane-2, 5-di(peroxylbenzoate), and the like.

Of these, dialkyl peroxides such as 2,5-dimethyl-2,5-di (tert-butylperoxy)hexane, etc. are especially preferable.

The foregoing organic peroxide component can be used in an amount of preferably 0.1 parts by mass or more and not more than 3.0 parts by mass, more preferably 0.2 parts by mass or more and not more than 2.5 parts by mass, and especially preferably 0.3 parts by mass or more and not more than 2.0 parts by mass based on 100 parts by mass of the rubber component.

The foregoing organic peroxide may be used alone or in combination of plural kinds thereof.

In addition, as the co-crosslinking agent which is further compounded in the fluoro rubber composition of the present embodiment, for example, triallyl isocyanurate (TAIC), triallyl cyanurate, diallyl phthalate, trivinyl isocyanurate, tri(5-norbornene-2-methylene) cyanurate, 1,3-butylene glycol dimethacrylate, 1,4-butylene glycol dimethacrylate, ethylene glycol dimethacrylate, diethylene glycol dimethacrylate, triethylene glycol dimethacrylate, tetraethylene glycol dimethacrylate, trimethylolpropane triacrylate, trimethylolpropane trimethacrylate, triallyl formal, triallyl trimellitate, dipropargyl terephthalate, tetraallyl terephthalate amide, triallyl phosphate, fluorinated triallyl isocyanurate (1,3,5-tris(2, 3,3-trifluoro-2-propenyl)-1,3,5-triazine-2,4,6-trione), triallyl phosphite, N,N-diallyl acrylamide, hexaallyl phosphoramide, N,N,N',N'-tetraallyl tetraphthalamide, N,N,N',N'-tetraallyl malonamide, 2,4,6-trivinyl methyltrisiloxane, triallyl phosphite, and the like can be used. However, it should not be construed that the present invention is limited thereto.

Among the foregoing co-crosslinking agents, in view of vulcanization properties and physical properties of vulcanizates, triallyl isocyanurate (TAIC) is preferable.

In addition, examples of the metal compound as the crosslinking auxiliary agent which is compounded in the fluoro rubber composition of the present embodiment, if desired include a metal oxide and a metal hydroxide each functioning as an acid acceptor (a material having chiefly an action to absorb an acidic substance produced by vulcanization).

Examples of the metal oxide include zinc white (ZnO), magnesium oxide, lead oxide, calcium oxide, zinc oxide, iron oxide, titanium oxide, silicon oxide, aluminum oxide, and the like. Of these, divalent metal oxides such as zinc white (ZnO), magnesium oxide, calcium oxide, etc. are preferable.

The foregoing metal compound can be, for example, used in an amount of preferably 0.1 parts by mass or more and not more than 20 parts by mass, more preferably 0.1 parts by mass or more and not more than 15 parts by mass, and especially preferably 1 part by mass or more and not more than 5 parts by mass based on 100 parts by mass of the rubber component.

The foregoing metal compound may be used alone or in combination of plural kinds thereof.

In the fluoro rubber composition of the present embodiment, in addition to the foregoing components, for example, a compounding agent which is generally used in the rubber industries, inclusive of a reinforcing agent such as a carbon fiber, etc.; a filler such as calcium carbonate, magnesium carbonate, aluminum hydroxide, magnesium hydroxide, aluminum silicate, magnesium silicate, calcium silicate, potassium titanate, titanium oxide, barium sulfate, aluminum borate, a glass fiber, an aramid fiber, diatomaceous earth, wollastonite, etc.; a processing aid such as a wax, a metallic soap, a carnauba wax, an alkylamine, etc.; an anti-aging agent; a thermoplastic resin; a clay; other fibrous filler; and the like, can be compounded as the need arises within the range where the effects of the organic peroxide and the co-crosslinking agent which are used in the present embodiment are not impaired.

Incidentally, as for the foregoing materials, it is preferable that the processing aid is contained in an amount of 0.1 parts by mass or more and not more than 10 parts by mass based on 100 parts by mass of the rubber component, and in particular, it is more preferable that the alkylamine is contained in an amount of 0.1 parts by mass or more and not more than 5.0 parts by mass. In addition, examples of the foregoing alkylamine include Farmin 86T (manufactured by Kao Corporation) and Armeen 18D (manufactured by Akzo Nobel).

In order to allow the fluoro rubber composition of the present embodiment to contain a rubber component containing a fluoro rubber and carbon black as described above and to have the $\delta G_A'$ (G'(1%)–G'(100%)) to 120 kPa or more and not more than 3,000 kPa in the foregoing dynamic viscoelasticity test by RPA, it is necessary to perform the kneading step (A) of compounding carbon black in the rubber component in the following manner.

That is, first of all, an average shear rate of a rotor tip point of a kneading machine (the roll surface in the case where the kneading machine is a roll) in the kneading step (A) is set up to 100 (1/sec) or more. When the average shear rate is less than 100 (1/sec), it may be impossible to disperse the carbon black to an extent of an aggregate unit to form a favorable carbon network reinforcing structure.

The foregoing average shear rate is preferably 300 (1/sec) or more, and more preferably 1,000 (1/sec) or more.

Here, when a rotor diameter is defined as R, a rotor tip point clearance is defined as C, and a rotor rotation rate is defined as N (rpm), the foregoing average shear rate ($\gamma$, 1/sec) can be determined by $\gamma = \pi \cdot R \cdot N/15C$ ($\pi$: ratio of the circumference of a circle to its diameter).

In addition, a kneading maximum temperature $T_m$ of the kneading step (A) of compounding carbon black in the foregoing rubber component is allowed to be 120° C. or higher and not higher than 200° C. When the kneading maximum temperature $T_m$ is 120° C. or higher and not higher than 200° C., the so-called "carbon gel" which is a gel obtained through binding of the fluoro rubber and the carbon black without causing decomposition of the rubber component or the like is suitably produced, and therefore, it is possible to make both a high tensile strength and a high elongation at break compatible with each other. From such a viewpoint, the $T_m$ is more preferably 140° C. or higher and not higher than 170° C., and still more preferably 155° C. or higher and not higher than 165° C.

Incidentally, the kneading maximum temperature $T_m$ is detected by installing a temperature sensor in plural places within the kneading machine.

Figure 1:
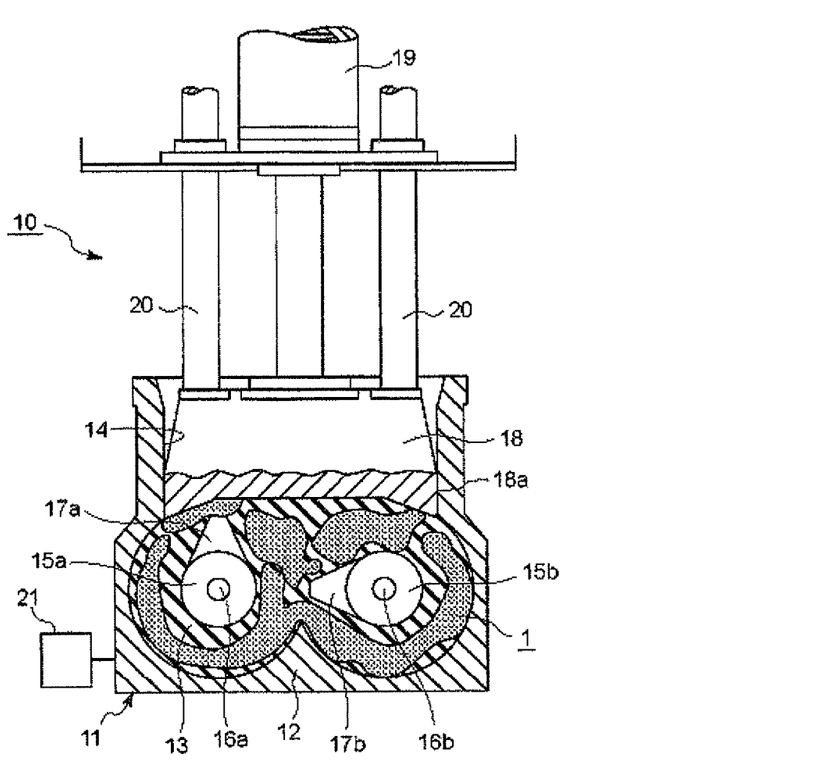
FIG. 1 is a diagrammatic view showing a hermetically closed kneading apparatus which is used in the manufacture of a fluoro rubber composition according to the present invention and an example of the kneading state within the apparatus.

A typical hermetically closed kneading apparatus which is used in the present embodiment is hereunder described. FIG. 1 is a diagrammatic view showing a hermetically closed kneading apparatus which is used in the manufacture of the fluoro rubber composition of the present embodiment and an example of the kneading state within the apparatus.

The hermetically closed kneading apparatus shown in FIG. 1 is a batch hermetically closed kneading apparatus of a tangent type single-blade system and is called an "internal mixer". This hermetically closed kneading apparatus 10 is constructed of a kneading machine 11 and a power unit 21, and a hydraulic cylinder 19 and guide rods 20. This kneading machine 11 is constructed of a combination of a kneading machine main body 12 and a floating weight 18. The kneading machine main body 12 forms a kneading chamber 13 having a shape in which two cylindrical faces shaped in a semicircular cross section are united. An opening 14 formed on the cylindrical faces is provided above the kneading chamber 13.

Incidentally, as for the foregoing internal mixer, a Banbury type or pressure kneader is generally used.

In a central axis of the semicircular cylindrical faces of the foregoing kneading chamber 13, a pair of rotors 15a and 15b is provided, and the first rotor 15a has a rotation axis 16a, whereas the second rotor 15b has a rotation axis 16b. The first rotor 15a and the second rotor 15b are provided with a first blade 17a and a second blade 17b, respectively. The pair of the rotors 15a and 15b are constructed in such a manner that they are mutually rotated by the power unit 21 toward a space between the both on the first and second rotation axes 16a and 16b and that the rubber component and the rubber compounding materials such as carbon black, etc. are kneaded by the mutual first blade 17a and second blade 17b while applying a shear, thereby manufacturing a mixture 1.

The floating weight 18 is provided with a peripheral surface 18a engaged with the inside of the opening 14 of the kneading machine main body 12 and achieves immobilization and pressure contact such that the rubber component and the rubber compounding materials such as carbon black, etc. are easily mixed with each other by the pressure from the hydraulic cylinder 19 and the guide rods 20. As for the shape of the floating weight, though a seagull type is better than a semicircular type, a Banbury type may also be adopted.

In FIG. 1, while the hermetically closed kneading apparatus having a batch hermetically closed kneading apparatus of a tangent type single-blade system has been shown, an engagement type single-blade system, a tangent type double-blade system or an engagement type double-blade system (provided with two rotors having two blades), or a tangent type triple-blade system or an engagement type triple-blade system (provided with two rotors having three blades) is similarly used.

In an open roll which is of an open system, it is usually difficult to increase the kneading maximum temperature $T_m$, and therefore, in that case, it is not preferable to use the open roll in the kneading step according to the present embodiment.

In the kneading step (A) (sometimes referred to as "masterbatch step"), in general, the rubber component is first thrown into the kneading machine, and after kneading for from 10 seconds to several minutes, the carbon black is thrown. The whole amount of the carbon black may be thrown at once, or the carbon black may be dividedly thrown several times.

Since the time when throwing of the carbon black into the kneading machine is completed, a power applied to the rotors of the kneading machine increases, and thereafter, the power decreases step by step, whereby the kneading step is terminated. The mixture of the rubber component and the carbon black, etc. is discharged from the kneading machine, whereby the kneading step (A) is terminated. The mixture after termination of the kneading step (A) is formed into a sheet by rolls (underrolls in the Banbury type kneading machine) and transferred into a next step.

After termination of the foregoing kneading step (A), the obtained mixture is cooled, and if desired, after going through an aging step (allowing to stand at room temperature (about 23° C.)), in general, the obtained mixture is formed into a vulcanizable fluoro rubber composition by a kneading step (B) of compounding the foregoing vulcanization system compounding agent.

Incidentally, if desired, a step of again kneading the mixture obtained in the kneading step (A) (also referred to as "masterbatch retail step" or "X-mill step") may be performed between the kneading step (A) and the kneading step (B).

In addition, as for a specific kneading apparatus for performing the kneading step (A) and the kneading step (B) for example, a Banbury mixer, a kneader, a uniaxial kneading machine, a biaxial kneading machine, and the like can be used in the kneading step (A); and the kneading machines which are used in the foregoing kneading step (A), a roll, a mill blender, and the like can be used in the kneading step (B).

As described above, in the present embodiment, it is needed to allow $\delta G_A'$ (G'(1%)–G'(100%)) of the foregoing vulcanizable fluoro rubber composition (unvulcanized) having gone through the kneading step (A) in a dynamic viscoelasticity test by the foregoing RPA to fall within a fixed range.

The vulcanizable fluoro rubber composition obtained by the above-described method is molded into a vulcanized article by means of pressurization, heating, and vulcanization.

Specifically, the foregoing vulcanizable fluoro rubber composition is usually heated at a temperature of from 140° C. to 230° C. under pressure for from about 1 to 120 minutes using an injection molding machine, a compression molding machine, a vulcanization press machine, an oven, or the like, to achieve crosslinking (vulcanization), whereby a vulcanized article can be molded. The foregoing vulcanization is a step of achieving crosslinking for forming a fixed shape. For a complicated shape, though the vulcanized article is preferably molded using a die, it may be possible to achieve the vulcanization even using an oven by means of air heating or the like.

In the present embodiment, secondary vulcanization can also be performed as the need arises. In the case of performing the secondary vulcanization, though the same method as described above may be performed, for example, a heat treatment may be performed at a temperature in the range of from 140° C. to 230° C. for from 1 to 24 hours depending upon an application. In that case, vulcanization (stepwise vulcanization) in which the temperature is increased stepwise between 140° C. and 230° C. may be performed, too.

<Bladder for Tire Fabrication>

The bladder for tire fabrication of the present embodiment is manufactured using the fluoro rubber composition of the foregoing present embodiment. Specifically, the foregoing bladder can be obtained by molding and vulcanizing the fluoro rubber composition of the present embodiment.

In general, in a tire fabrication step, there are used roughly classified two kinds of bladders inclusive of a bladder for tire molding to be used at the time of assembling respective constituent members of a tire to mold a green tire (unvulcanized tire) and a bladder for tire vulcanization to be used for giving an ultimate product tire shape at the time of vulcanization. The fluoro rubber composition of the present embodiment can be used for the manufacture of all of the foregoing bladders.

In particular, in view of the fact that the bladder for tire molding of the present embodiment uses the fluoro rubber composition of the foregoing present embodiment, it does not require conventional silicone coating, has a high strength as compared with the conventional techniques, and is able to greatly enhance a use life. Also, the bladder for tire molding of the present embodiment has a high tear strength as compared with the conventional techniques. In addition, in view of the fact that the bladder for tire vulcanization of the present embodiment uses the fluoro rubber composition of the foregoing present embodiment, its coefficient of friction is small, and its release properties are greatly enhanced. Therefore, it is possible to prevent the adhesion between the bladder and the green tire from occurring without coating with a release agent. Thus, not only the conventional coating step with a release agent can be omitted, and adverse influences against the tire quality can be prevented, but it is possible to greatly enhance the use life.

EXAMPLES

The present invention is hereunder described in more detail with reference to the following Examples, but it should be construed that the present invention is not limited thereto at all.

Incidentally, various characteristics were measured according to the following methods.

(1) Dynamic Viscoelasticity Test (Shear Modulus):

As for an unvulcanized rubber, strain dispersion was measured at 100° C. and 1 Hz using a rubber process analyzer RPA-2000 (manufactured by Alpha Technologies), thereby determining a shear modulus 0'. At that time, each of G's at a dynamic strain of 1% and 100% was determined, and $\delta G_A'$ (G'(1%)–G'(100%)) was calculated.

On the other hand, an unvulcanized rubber was vulcanized within RPA-2000 at 160° C. for 30 minutes, and subsequently, strain dispersion was measured at 60° C. and 1 Hz, thereby determining a shear modulus G' of the vulcanized rubber. At that time, each of G's at a dynamic strain of 1% and 10% was determined, and $\delta G_B'$ (G'(1%)–G'(10%)) was calculated.

(2) Elongation at Break (%) and Tensile Strength (MPa)

The measurement was performed at 25° C. and 160° C. in conformity with JIS K 6251:2004. As for samples, a dumbbell No. 3 shape was used with respect to the results shown in Table 1, and a dumbbell No. 6 shape was used with respect to the results shown in Table 2 (thickness of a parallel portion of each of the dumbbells: 2 mm)

(3) Tear Strength (N/mm):

The measurement was performed at 25° C. and 160° C. in conformity with JIS K 6252:2001. As for samples, an unnotched angle shape (thickness: 2 mm) was used.

(4) Fatigue Resistance:

A De Mattia flex-cracking test was performed at 25° C. in conformity with JIS K 6260:1999, and a number of double bends reaching the breakage was determined.

Example A1 and Comparative Examples A1 to A4

Manufacture of Fluoro Rubber Composition

According to each of compoundings shown in Table 1, the kneading step (A) of kneading components exclusive of a co-crosslinking agent and an organic peroxide with a fluoro rubber and carbon black was carried out under a condition shown in the table, and when a kneading temperature reached a maximum temperature $T_m$, the kneaded material was released to obtain a masterbatch (mixture). Incidentally, a hermetically closed mixer having a kneading capacity of one liter (DS1-5 MHB-E Model kneader, manufactured by Moriyama Company Ltd.) was used as a kneading machine, and a 10-inch roll (manufactured by Sakurai Roll K.K.) was used as a roll type.

After going through an aging step of allowing the masterbatch obtained in the kneading step (A) to stand at room temperature (23° C.) for 12 hours, a co-crosslinking agent and an organic peroxide shown in Table 1 were added to the foregoing masterbatch, and the contents were kneaded at 100° C. using an 8-inch open roll (kneading step (3)), thereby obtaining a vulcanizable fluoro rubber composition. Incidentally, zinc white and an alkylamine may be added in the kneading step (A), may be added in the kneading step (B), or may be dividedly added in the kneading steps (A) and (B).

(Evaluation)

The obtained vulcanizable fluoro rubber composition (unvulcanized) was processed into a sheet form and then subjected to press vulcanization in a die under a condition at a pressure of 2.0 MPa and a temperature of 160° C. for 30 minutes, thereby obtaining a sheet having a thickness of 2 mm. The obtained sheet of the vulcanized fluoro rubber composition was used and measured for the shear modulus by the dynamic viscoelasticity test, the elongation at break, the tensile strength, the tear strength, and the fatigue resistance by the foregoing methods. On the other hand, a sheet of the foregoing unvulcanized fluoro rubber composition was separately measured for the shear modulus by the dynamic viscoelasticity test.

The results are shown in Table 1.

TABLE 1

|  | Example 1A | Comparative Example A1 | Comparative Example A2 | Comparative Example A3 | Comparative Example A4 |
|---|---|---|---|---|---|
| Compounding formulation (parts by mass) | | | | | |
| Fluoro rubber*1 | 100 | 100 | 100 | 100 | 100 |
| Carbon black-A*2 | — | 25 | — | — | — |
| Carbon black-B*3 | — | — | — | — | — |
| Carbon black-C*4 | 25 | — | 25 | 25 | 60 |
| Zinc white | 3.0 | 3.0 | 3.0 | 3.0 | 3.0 |
| Co-crosslinking agent*5 | 0.5 | 0.5 | 0.5 | 0.5 | 0.5 |
| Organic peroxide*6 | 2.5 | 2.5 | 2.5 | 2.5 | 2.5 |
| Alkylamine*7 | 1.0 | 1.0 | 1.0 | 1.0 | 1.0 |
| Kneading condition | | | | | |
| Kneading machine | Mixer | Mixer | Roll | Mixer | Mixer |
| Shear rate (1/sec) | 300 | 300 | 10 | 300 | 300 |
| Maximum temperature (° C.) | 165 | 165 | 110 | 210 | 165 |
| Physical characteristics | | | | | |
| δG'$_A$ (G'(1%) − G'(100%)) | 900 | 80 | 450 | 1800 | 2500 |
| δG'$_B$ (G'(1%) − G'(10%)) | 1200 | 80 | 80 | 2000 | 3000 |
| Elongation at break (% at 25° C.) | 550 | 420 | 320 | 260 | 200 |
| Tensile strength (MPa at 25° C.) | 23 | 13 | 16 | 32 | 25 |
| Tear strength (N/mm at 25° C.) | 33 | 16 | 12 | 60 | 40 |
| Elongation at break (% at 160° C.) | 360 | 110 | 130 | 90 | 60 |
| Tensile strength (MPa at 160° C.) | 9 | 2.5 | 1.6 | 12 | 8 |
| Tear strength (N/mm at 160° C.) | 13 | 2.5 | 0.8 | 0.6 | 0.5 |
| Fatigue resistance (number of times at 25° C.) | 20000 | 100 | 85 | 70 | 10 |

[Note]
*1Fluoro rubber: A copolymer of vinylidene fluoride, hexafluoropropylene, and tetrafluoroethylene, a trade name: GBL600S, manufactured by DuPont Elastomer Co., Ltd.
*2Carbon black-A: MT ($N_2$SA: 12 m$^2$/g, DBP absorption amount: 41 mL/100 g), a trade name: Thermax N-990, manufactured by Cancarb
*3Carbon black-B: GPF ($N_2$SA: 27 m$^2$/g, DBP absorption amount: 87 mL/100 g), a trade name: Asahi #60, manufactured by Asahi Carbon Co., Ltd.
*4Carbon black-C: ISAF ($N_2$SA: 119 m$^2$/g, DBP absorption amount: 114 mL/100 g), a trade name: Seast 6, manufactured by Tokai Carbon Co., Ltd.
*5Co-crosslinking agent: Triallyl isocyanurate, a trade name: Diak-7, manufactured by DuPont Elastomer Co., Ltd.
*6Organic peroxide: 2,5-Dimethyl-2,5-di(tert-butylperoxy)hexane, a trade name: Perhexa 25B40 (active ingredient: 40%), manufactured by NOF Corporation
*7Alkylamine: A monoalkyl primary amine, a trade name: Armeen 18D, manufactured by Akzo Nobel Examples B1 to B6 and Comparative Examples E1 to B3

Manufacture of Fluoro Rubber Composition

According to each of compoundings shown in Table 2, the kneading step (A) of kneading components exclusive of a co-crosslinking agent and an organic peroxide with a fluoro rubber and carbon black was carried out under a condition shown in the table, and when a kneading temperature reached a maximum temperature $T_m$, the kneaded material was released to obtain a masterbatch (mixture). Incidentally, a 0.5-liter hermetically closed mixer (MIX-LABO, manufactured by Moriyama Company Ltd.) and a 35-liter hermetically closed mixer (manufactured by Toshin Co., Ltd.) were used as a mixer type kneading machine, and an 8-inch roll (manufactured by Kansai Roll Co., Ltd.) and a 22-inch roll (manufactured by Kobe Kikai K.K.) were used as a roll type.

After going through an aging step of allowing the masterbatch obtained in the kneading step (A) to stand at room temperature (23° C.) for 12 hours, a co-crosslinking agent and an organic peroxide shown in Table 2 were added to the foregoing masterbatch, and the contents were kneaded at 100° C. using an 8-inch open roll (kneading step (B)), thereby obtaining a vulcanizable fluoro rubber composition. Incidentally, zinc white and an alkylamine may be added in the kneading step (A), may be added in the kneading step (B), or may be dividedly added in the kneading steps (A) and (B).

(Evaluation)

The obtained vulcanizable fluoro rubber composition (unvulcanized) was processed into a sheet form and then subjected to press vulcanization in a die under a condition at a pressure of 2.0 MPa and a temperature of 160° C. for 30 minutes, thereby obtaining a sheet having a thickness of 2 mm. The obtained sheet of the vulcanized fluoro rubber composition was used and measured for the shear modulus by the dynamic viscoelasticity test, the elongation at break, the tensile strength, the tear strength, and the fatigue resistance by the foregoing methods. On the other hand, a sheet of the foregoing unvulcanized fluoro rubber composition was separately measured for the shear modulus by the dynamic viscoelasticity test.

The results are shown in Table 2.

TABLE 2

|  | Example B1 | Example B2 | Example B3 | Example B4 | Example B5 | Example B6 | Comparative Example B1 | Comparative Example B2 | Comparative Example B3 |
|---|---|---|---|---|---|---|---|---|---|
| Compounding formulation (parts by mass) | | | | | | | | | |
| Fluoro rubber-A*[1] | 100 | — | 100 | 100 | 100 | 100 | — | — | 100 |
| Fluoro rubber-B*[2] | — | 100 | — | — | — | — | 100 | 100 | — |
| Carbon black-A*[3] | — | — | — | — | — | — | 25 | — | — |
| Carbon black-B*[4] | — | — | — | — | — | — | — | 25 | — |
| Carbon black-C*[5] | 25 | 25 | — | — | 25 | 25 | — | — | 25 |
| Carbon black-D*[6] | — | — | 30 | 45 | — | — | — | — | — |
| Zinc white | 1.0 | 1.0 | 1.0 | 1.0 | 1.0 | — | 1.0 | 1.0 | — |
| Co-crosslinking agent*[7] | 0.83 | 0.83 | 0.83 | 1.67 | 2.5 | 2.5 | 0.83 | 0.83 | 2.5 |
| Organic peroxide*[8] | 1.88 | 1.88 | 2.5 | 2.5 | 2.5 | 2.5 | 1.88 | 1.88 | 2.5 |
| Alkylamine*[9] | 1.0 | 1.0 | 1.0 | 1.0 | 1.0 | 1.0 | 1.0 | 1.0 | 1.0 |
| Kneading condition | | | | | | | | | |
| Kneading machine | Mixer | Mixer | Mixer | Mixer | Mixer | Mixer | Mixer | Roll | Mixer |
| Shear rate (1/sec) | 829 | 829 | 829 | 829 | 106 | 1106 | 829 | 84 | 1800 |
| Maximum temperature (° C.) | 166 | 164 | 175 | 164 | 170 | 173 | 152 | 70 | 219 |
| Physical characteristics | | | | | | | | | |
| $\delta G'_A$ (G'(1%) − G'(100%)) | 734 | 709 | 821 | 1448 | 1461 | 1393 | 252 | 372 | 9206 |
| $\delta G'_B$ (G'(1%) − G'(10%)) | 1007 | 1022 | 1772 | 3070 | 1947 | 1502 | 97 | 523 | 6424 |
| Elongation at break (% at 25° C.) | 610 | 410 | 450 | 410 | 620 | 560 | 470 | 290 | 320 |
| Tensile strength (MPa at 25° C.) | 18.5 | 22.1 | 17.1 | 18.5 | 16.3 | 18.2 | 11 | 9.9 | 6.9 |
| Tear strength (N/mm at 25° C.) | 41.5 | 36.4 | 45.4 | 47.7 | 47.1 | 43.2 | 22.6 | 26.9 | 49.2 |
| Elongation at break (% at 160° C.) | 440 | 190 | 360 | 220 | 410 | 310 | 60 | 120 | 80 |
| Tensile strength (MPa at 160° C.) | 5.1 | 5.6 | 7.1 | 7.5 | 5.4 | 5.4 | 2.3 | 3.3 | 1.0 |
| Tear strength (N/mm at 160° C.) | 15.4 | 13.7 | 15.8 | 15.5 | 19.4 | 17.2 | 5.9 | 7.7 | 6.8 |
| Fatigue resistance (number of times at 25° C.) | >20000 | >20000 | >20000 | >20000 | >20000 | >20000 | >20000 | 300 | 17 |

[Note]
*[1]Fluoro rubber-A: A binary copolymer of vinylidene fluoride and hexafluoropropylene, a trade name: G801, manufactured by Daikin Industries, Ltd.
*[2]Fluoro rubber-B: A ternary copolymer of vinylidene fluoride, tetrafluoroethylene, and hexafluoropropylene, a trade name: G9074, manufactured by Daikin Industries, Ltd.
*[3]Carbon black-A: MT ($N_2SA$: 12 $m^2$/g, DBP absorption amount: 41 mL/100 g), a trade name: Thermax N990, manufactured by Cancarb Thermix
*[4]Carbon black-B: GPF ($N_2SA$: 27 $m^2$/g, DBP absorption amount: 87 mL/100 g), a trade name: Seast V, manufactured by Tokai Carbon Co., Ltd.
*[5]Carbon black-C: ISAF ($N_2SA$: 119 $m^2$/g, DBP absorption amount: 114 mL/100 g), a trade name: Seast 6, manufactured by Tokai Carbon Co., Ltd.
*[6]Carbon black-D: HAF ($N_2SA$: 79 $m^2$/g, DBP absorption amount: 101 mL/100 g), a trade name: Seast 3, manufactured by Tokai Carbon Co., Ltd.
*[7]Co-crosslinking agent: Triallyl isocyanurate (TAIC), a trade name: TAIC (registered trademark), manufactured by Nippon Kasei Chemical Co., Ltd.
*[8]Organic peroxide: 2,5-Dimethyl-2,5-di(tert-butylperoxy)hexane, a trade name: Perhexa 25B40, manufactured by NOF Corporation
*[9]Alkylamine: Stearylamine, a trade name: Farmin 86T, manufactured by Kao Corporation <Performance of Bladder for Tire Fabrication>

A bladder for tire vulcanization and a bladder for tire molding were fabricated, respectively by using each of a conventionally used butyl compounded rubber composition and the fluoro rubber compositions of Examples A1 and E1.

Using the obtained bladder for tire vulcanization, vulcanization of a tire having a tire size of PSR215/60R15.5 was carried out for a vulcanization time of 15 minutes without coating a release agent on the bladder surface and the inner surface of the green tire until the bladder was punctured, thereby evaluating its use life (number of times of vulcanization). In addition, as for the bladder for tire molding, the number of tires which can be molded was evaluated in the same manner using a general tire for passenger car. However, as for the bladder for tire vulcanization using the conventionally used butyl compounded rubber composition, a release agent was coated on the bladder surface and the inner surface of the green tire.

As a result, the use life of the bladder for tire vulcanization was 300 times for the bladder using the conventional rubber composition, whereas it was 2,000 times for the bladder using each of the fluoro rubber compositions of Examples A1 and B1.

In addition, the number of tires which can be molded on the bladder for tire molding was 3,000 for the bladder using the conventional rubber composition, whereas it was 10,000 for the bladder using each of the fluoro rubber compositions of Examples A1 and B1.

The invention claimed is:

1. A fluoro rubber composition comprising a rubber component comprising:
    a fluoro rubber;
    carbon black; and
    a vulcanization system compounding agent containing a co-crosslinking agent,
    wherein the fluoro rubber is at least one member selected among (A) a copolymer of tetrafluoroethylene/perfluoroalkyl vinyl ether, (B) a copolymer of tetrafluoroethylene/propylene, and (C) a copolymer made of (i) at least one monomer selected among tetrafluoroethylene, hexafluoropropylene, pentafluoropropylene, trifluoroethylene, chlorotrifluoroethylene, vinyl fluoride, perfluoroalkyl vinyl ether and propylene, and (ii) vinylidene fluoride;
    in a kneading step of compounding the carbon black in the rubber component, an average shear rate of a rotor tip point of a kneading machine is 100 (1/sec) or more, and a kneading maximum temperature $T_m$ is 120° C. or higher and not higher than 200° C.; and
    in a dynamic viscoelasticity test of an unvulcanized rubber by a rubber process analyzer (RPA) (measurement temperature: 100° C., measurement frequency: 1 Hz), a difference $\delta G_A'$ (G'(1%)−G'(100%)) between a shear modulus G'(1%) at the time of a dynamic strain of 1% and a shear modulus G'(100%) at the time of a dynamic strain of 100% is 120 kPa or more and not more than 3,000 kPa, wherein the elongation at break at 25° C. of the fluoro rubber composition after vulcanization is 400% or more and not more than 800%, and wherein a compounding amount of the co-crosslinking agent is 0.5 to 2.5 parts by mass based on 100 parts by mass of the rubber component.

2. The fluoro rubber composition according to claim 1, wherein in a dynamic viscoelasticity test of a vulcanized rubber by a rubber process analyzer (RPA) (measurement temperature: 60° C., measurement frequency: 1 Hz), a difference $\beta G_B'$ ($G'(1\%)$–$G'(10\%)$) between a shear modulus $G'(1\%)$ at the time of a dynamic strain of 1% and a shear modulus $G'(10\%)$ at the time of a dynamic strain of 10% is 200 kPa or more and not more than 10,000 kPa.

3. The fluoro rubber composition according to claim 1, wherein after vulcanization, a tensile strength at 25° C. is 10 MPa or more and not more than 50 MPa, and a tensile strength at 160° C. is 1 MPa or more and not more than 20 MPa, and an elongation at break at 160° C. is 150% or more and not more than 500%.

4. The fluoro rubber composition according to claim 1, wherein after vulcanization, a tear strength at 25° C. is 20 N/mm or more and not more than 60 N/mm, and a tear strength at 160° C. is 3 N/mm or more and not more than 30 N/mm.

5. The fluoro rubber composition according to claim 1, wherein a compounding amount of the carbon black is 10 parts by mass or more and not more than 50 parts by mass based on 100 parts by mass of the rubber component.

6. The fluoro rubber composition as set forth in claim 2, wherein the vulcanization system compounding agent contains an organic peroxide, and the organic peroxide is a dialkyl peroxide.

7. The fluoro rubber composition according to claim 2, wherein the co-crosslinking agent is triallyl isocyanurate.

8. A bladder for tire fabrication, which is manufactured using the fluoro rubber composition according to claim 1.

* * * * *